United States Patent [19]

Kido et al.

[11] 4,174,430

[45] Nov. 13, 1979

[54] PROCESS FOR PRODUCING POROUS POLYSTYRENE GEL

[75] Inventors: Shiro Kido; Tetsuo Yokota; Yasuhiro Nakahara, all of Shin-nanyo, Japan

[73] Assignee: Toyo Soda Manufacturing Co., Ltd., Yamaguchi, Japan

[21] Appl. No.: 927,336

[22] Filed: Jul. 24, 1978

[30] Foreign Application Priority Data

Jul. 27, 1977 [JP] Japan .................. 52-89303

[51] Int. Cl.² ............................. C08J 9/00
[52] U.S. Cl. .................. 521/146; 260/31.2 R; 260/32.4; 260/33.4 R; 260/33.6 UA; 521/921; 526/207; 526/219; 526/227; 526/232.1; 526/336
[58] Field of Search .............. 521/56, 53, 421, 146; 526/207, 336

[56] References Cited

U.S. PATENT DOCUMENTS

| Re. 27,026 | 1/1971 | Alfrey, Jr. et al. | 521/56 |
| 3,418,262 | 12/1968 | Werotte et al. | 521/63 |
| 3,549,562 | 12/1970 | Mindick et al. | 526/207 |
| 3,791,999 | 2/1974 | Fuchiwaki et al. | 521/63 |
| 3,948,821 | 4/1976 | DeBenneville | 521/53 |

*Primary Examiner*—Morton Foelak
*Attorney, Agent, or Firm*—Oblon, Fisher, Spivak, McClelland & Maier

[57] ABSTRACT

A porous polystyrene gel is produced by a suspension polymerization in an aqueous system under an incorporation of more than 5 mole % of a radical polymerization catalyst to a total amount of styrene and divinyl benzene with an inert organic solvent.

10 Claims, 2 Drawing Figures

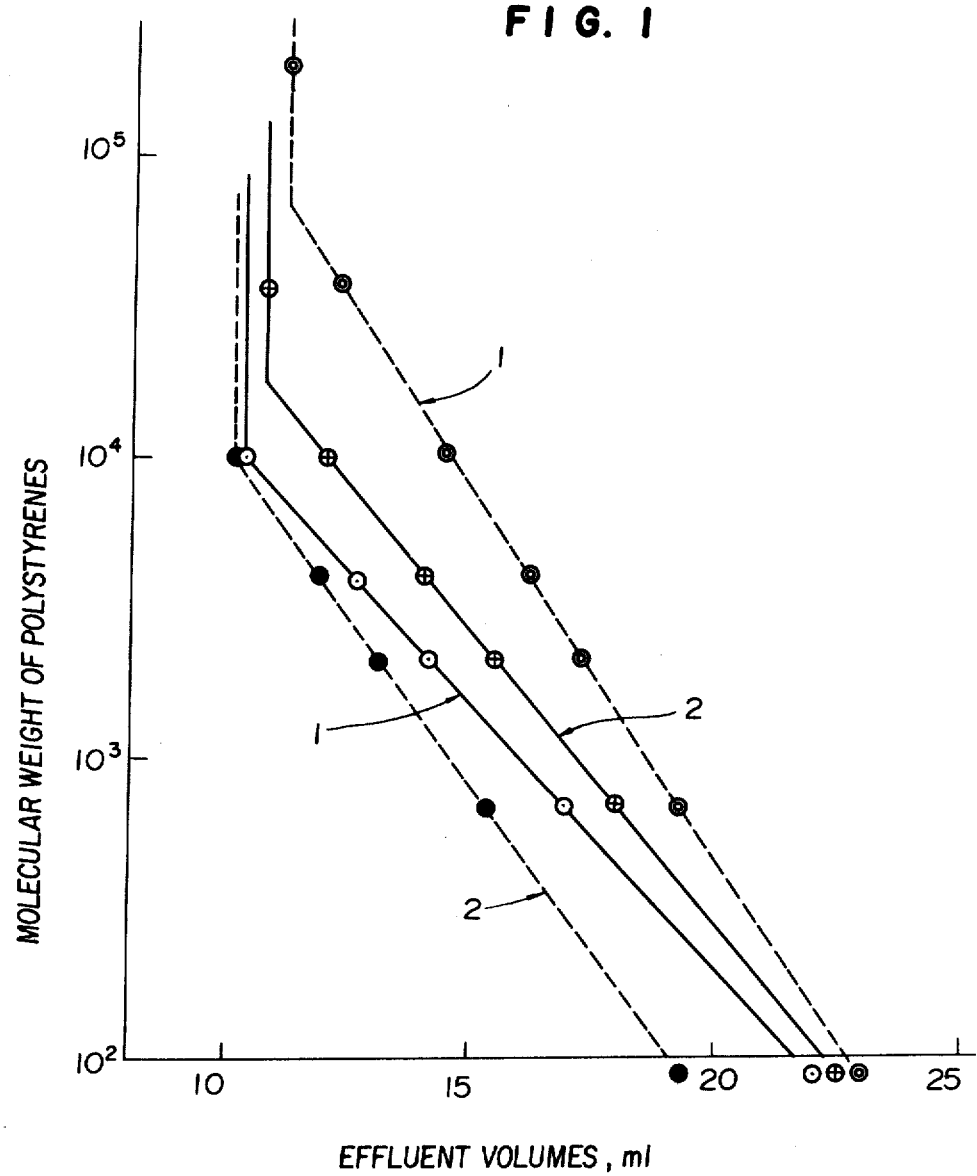

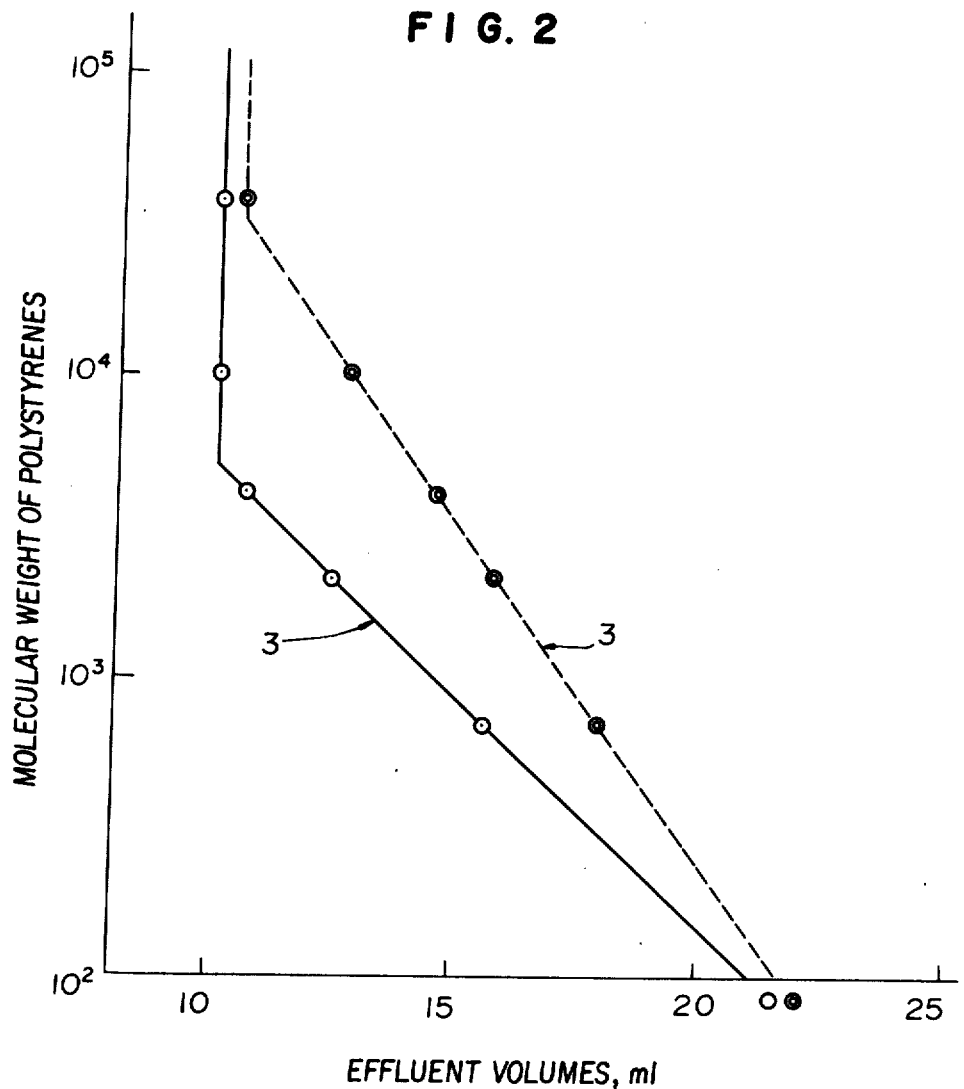

PROCESS FOR PRODUCING POROUS POLYSTYRENE GEL

BACKGROUND OF THE INVENTION

1. Field of the Invention

The present invention relates to a process for producing a porous polystyrene gel which is suitable as a chromatography filler by an aqueous suspension polymerization of styrene and divinyl benzene.

2. Description of the Prior Art

In general, porous polystyrene gels obtained by an aqueous suspension polymerization of styrene and divinyl benzene with an organic solvent, have been used in various applications as fillers for a chromatography especially a gel permeation chromatography (GPC).

In the gel permeation chromatography, the porous polystyrene gel is filled in a column and a solution of a sample in a solvent is fed into the column whereby samples having different molecular weights can be separated under the phenomenon that molecules having lower molecular weights are highly diffused into the gel and the discharge of the molecules having lower molecular weights from the column is delayed.

The porous polystyrene gel as the filler for chromatography is obtained by an aqueous suspension polymerization with an organic solvent in a form of beads having a diameter of about 1 to 1000$\mu$. The structure of the porous polystyrene gel has three dimentional network structure formed by a crosslinking agent of divinyl benzene and it is the porous material having many pores through the inner parts by the effect of the organic solvent.

Thus, the porous polystyrene gel imparts a function as the filler for a chromatography especially a gel permeation chromatography. The separation factor of the gel is improved depending upon the increase of a volumetric ratio of pores included in the gel. However, the strength of the gel is decreased depending upon the increase of the volumetric ratio of pores. Accordingly, the volumetric ratio of the pores is limited.

On the other hand, the volumetric ratio of the pores in the porous polystyrene gel corresponds to the ratio of the organic solvent included in the preparation of the gel. In accordance with the conventional process for producing the porous polystyrene gel by adding 60 to 67% of an organic solvent, to impart the balanced characteristics of the separation factor and the strength of the gel, it has been difficult to obtain the porous polystyrene gel which can separate standard polystyrenes having a maximum molecular weight of less than 50,000 by the gel permeation chromatography.

Accordingly, it is necessary to decrease the ratio of the organic solvent to the monomers, though the separation factor is decreased. As the result, it has been difficult to obtain a porous polystyrene gel having a satisfactory separation factor and only the gel having inferior separation factor has been obtained.

The inventors have studied to obtain a porous polystyrene gel having an improved separation factor. It has been a common knowledge to minimize an amount of a catalyst in the suspension polymerization. However, the inventors have found that the separation factor of the porous polystyrene gel has been improved depending upon the increase of an amount of the radical polymerization catalyst.

The present invention has been attained by the finding.

SUMMARY OF THE INVENTION

It is an object of the present invention to provide a process for producing a porous polystyrene gel which has significant high separation factor with high strength.

The foregoing object of the present invention has been attained by providing a process for producing a porous polystyrene gel which comprises incorporating a significant amount of a radical polymerization catalyst as more than 5 mole % to a total amount of styrene and divinyl benzene in an aqueous suspension polymerization.

DETAILED DESCRIPTION OF THE PREFERRED EMBODIMENTS

Heretofore, the conventional porous polystyrene gel has been produced by copolymerizing styrene and divinyl benzene with an incorporated organic solvent in an aqueous medium.

In these conventional processes, the amount of a radical polymerization catalyst is less than 2 mole % to a total amounts of styrene and divinyl benzene as described in Japanese Patent Publication No. 40297/1970, U.S. Pat. No. 3,322,695 and J. Polymer Sci. Part A-2, 835 (1964) and Makromol Chem, 88 75 (1965).

However, in accordance with the present invention, the amount of radical polymerization catalyst is more than 5 mole % preferably 5 to 15 mole % to a total amount of styrene and divinyl benzene.

Suitable radical polymerization catalysts include organic peroxides such as benzoyl peroxide, lauryl peroxide, diisopropyl peroxy-dicarbonate and t-butyl peroxy-pivalate and azo compounds such as azo-bis-isobutyronitrile and 2,2'-azo-bis(2,4-dimethyl valeronitrile).

The ratio of divinyl benzene to styrene can be in a range of 10 to 100% to 90 to 0% (preferably 20 to 90% to 80 to 10%).

The aqueous suspension polymerization can be carried out by the conventional process under stirring at 50° to 120° C. preferably 60° to 90° C. if necessary with a dispersing agent or the other additive.

The organic solvents must be miscible to both of styrene and divinyl benzene and inert to polystyrene and polydivinyl benzene and swell the resulting copolymer.

Suitable organic solvents include aromatic hydrocarbons such as toluene and benzene; aliphatic esters such as ethyl acetate and butyl acetate; saturated aliphatic hydrocarbons such as nonane and dodecane; alcohols such as n-amyl alcohol and isoamyl alcohol and nitro compounds such as nitromethane and nitroethane.

The organic solvent or the mixture of the organic solvent can be used in an amount ranging from 50 to 250 wt. % preferably about 100 to 200 wt. % based on a total amount of styrene and divinyl benzene.

As described above, in accordance with the present invention, the porous polystyrene gel having significantly superior separation factor to that of the conventional gel as a filler for chromatography can be obtained though the process is simple.

Referring to the drawings, the present invention will be illustrated in detail by certain examples which are provided herein for purposes of illustration only and are not intended to be limiting in any manner.

EXAMPLE 1 AND REFERENCES 1 AND 2

In a 2 liter stainless steel autoclave equipped with an induction stirrer, 40 g of styrene, and 60 g of a divinyl benzene and ethyl styrene mixture containing 55% of divinyl benzene component, 105 g of nitroethane, 45 g of n-amyl alcohol, 1000 g of water, 120 g of calcium phosphate, 0.065 g of sodium dodecyl benzenesulfonate and 30 g of benzoyl peroxide were charged. The mixture was polymerized at 80° C. under stirring at 1000 rpm for 6 hours and the resulting copolymer was washed to obtain a porous polystyrene gel having a diameter of about 5 to 100μ.

In Reference 1, the process was repeated except using 0.2 g of benzoyl peroxide.

In Reference 2, the process was repeated except using 70 g of nitroethane, 30 g of n-amyl alcohol and 0.2 g of benzoyl peroxide. As the results, the porous polystyrene gels were obtained.

The particle sizes of the resulting porous polystyrene gel were sieved to separate the gels having a diameter of 15 to 25μ. The porous polystyrene gels were respectively filled in each column having an inner diameter of 0.75 cm and a length of 60 cm. The chromatogram of standard polystyrenes having various molecular weights (manufactured by Pressure Chemical Company in U.S.A.) was measured for each column with tetrahydrofuran solvent.

The calibration curves obtained from the results are shown in FIG. 1 (Example 1: full line 1 and References 1 and 2: dotted line 1 and 2).

As shown in FIG. 1, the separatable maximum molecular weight was remarkably low in Example 1. This fact shows the significant improvement of the separation factor in the range of the molecular weights.

The maximum molecular weight of Reference 2 was the same with that of Example 1 however, the inclination of the curve of Example 1 is slower than that of Reference 2 whereby the porous styrene gel of Example 1 had superior separation factor.

EXAMPLE 2

In accordance with the process of Example 1 except using 25 g of azobisisobutyronitrile and polymerizing at 75° C., a porous polystyrene gel was prepared.

In accordance with the process of Example 1 except using the resulting porous polystyrene gel, the calibration curve was obtained. The calibration curve was substantially the same with that of Example 1 (full line 1).

EXAMPLE 3

In accordance with the process of Example 1 except using 25 g of t-butyl peroxypivalate and polymerizing at 65° C., a porous polystyrene gel was prepared.

In accordance with the process of Example 1 except using the resulting porous polystyrene gel, the calibration curve was obtained. The calibration curve was substantially the same with that of Example 1 (full line 1).

EXAMPLE 4

In accordance with the process of Example 1 except using 15 g of benzoyl peroxide, a porous polystyrene gel was prepared.

In accordance with the process of Example 1 except using the resulting porous polystyrene gel, the calibration curve was obtained. The calibration curve was as the full line 2 in FIG. 1. The effect is depending upon the amount of benzoyl peroxide however, the effect is superior to that of Reference 1 as compared with the dotted line 1 in FIG. 1.

EXAMPLE 5 AND REFERENCE 3

In accordance with the process of Example 1 except using 130 g of toluene instead of nitroethane and n-amyl alcohol, a porous polystyrene gel was prepared.

In accordance with the same process except using 0.2 g of benzoyl peroxide as the reference, a porous polystyrene gel was prepared.

In accordance with the process of Example 1 except using the resulting porous polystyrene gels, the calibration curves were obtained as shown in FIG. 2 wherein Example 5: full line 3 and Reference 3: dotted line 3.

As shown in FIG. 2, the effect of the present invention is clearly found though the solvent is different.

In FIGS. 1 and 2, the effluent volumes in the chromatography are plotted on the abscissa and logarithm of molecular weights of standard polystyrenes used in the chromatography are plotted on the ordinate. They are calibration curves for the porous polystyrene gels.

Full line 1: Example 1;
Full line 2: Example 4;
Full line 3: Example 5;
Dotted line 1: Reference 1;
Dotted line 2: Reference 2;
Dotted line 3: Reference 3.

What is claimed is:

1. A process for producing a porous polystyrene gel of improved gel permeation chromatographic properties which comprises polymerizing styrene and divinylbenzene with an inert organic solvent in an aqueous suspension polymerization, in the presence of a radical polymerization catalyst, wherein said catalyst is present in an amount of more than 5 mole % of the total amount of styrene and divinyl benzene.

2. A process according to claim 1 wherein the radical polymerization catalyst is an organic peroxide.

3. A process according to claim 2 wherein the organic peroxide is benzoyl peroxide, lauryl peroxide, diisopropyl peroxydicarbonate or t-butyl peroxypivalate.

4. A process according to claim 1 wherein the radical polymerization catalyst is an azo compound.

5. A process according to claim 4 wherein the azo compound is azo-bis-isobutyronitrile or 2,2'-azo-bis(2,4-dimethyl valeronitrile).

6. A process according to claim 1 wherein said inert organic solvent is selected from the group consisting of toluene, benzene, ethylacetate, butylacetate, nonane, dodecane, n-amyl alcohol, isoamyl alcohol, nitromethane and nitroethane and wherein the incorporated amount of said inert organic solvent depends upon the desired porosity of the porous polystyrene gel.

7. The process of claim 1 wherein said aqueous suspension polymerization is carried out at a temperature of 50° to 120° C.

8. The process of claim 7 wherein said temperature is 60° to 90° C.

9. The process of claim 1 wherein said organic solvent is used in an amount of from 50 to 250% by weight based on the total amount of styrene and divinyl benzene.

10. The process of claim 9 wherein said organic solvent is present in an amount of from 100 to 200 weight %.

* * * * *